US006249371B1

(12) United States Patent
Masuda et al.

(10) Patent No.: US 6,249,371 B1
(45) Date of Patent: Jun. 19, 2001

(54) WAVELENGTH CONVERTER

(75) Inventors: Hisashi Masuda, Tokyo; Shigeo Kubota, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/264,941

(22) Filed: Mar. 9, 1999

(30) Foreign Application Priority Data

Mar. 13, 1998 (JP) .................................................. 10-063630

(51) Int. Cl.$^7$ ...................................................... G02F 1/35
(52) U.S. Cl. ............................. 359/326; 359/328; 372/22
(58) Field of Search .................................. 359/326–332; 372/21–22

(56) References Cited

U.S. PATENT DOCUMENTS

| 4,933,944 | * | 6/1990 | McGraw | 359/326 X |
| 5,134,622 | * | 7/1992 | Deacon | 372/21 |
| 5,144,630 | * | 9/1992 | Lin | 372/22 |
| 5,206,868 | * | 4/1993 | Deacon | 372/21 |
| 5,408,481 | * | 4/1995 | Scheps | 372/22 |

(List continued on next page.)

FOREIGN PATENT DOCUMENTS 9-318985   12/1997 (JP) ................................. G02F/1/37

OTHER PUBLICATIONS

D. Berkeland Et Al., "Sum–Frequency Generation of Continuous–Wave Light at 194 NM," Applied Optics, vol. 36, No. 18, Jun. 20, 1997, pp. 4159–4162.

K. Kato, "Temperature–Tuned 90° Phase–Matching Properties of LiB3O5," IEEE Journal of Quantum Electronics, vol. 30, No. 12, Dec. 1994, pp. 2950–2952.

G. Boyd Et Al., "Parametric Interaction of Focused Gaussian Light Beams," Journal of Applied Physics, vol. 39, No. 8, Jul. 1968, pp. 3597–3639.

K. Kato, "Second–Harmonic Generation to 2048 Å in β–BaB2O4," IEEE Journal of Quantum Electronics, vol. QE–22, No. 7, Jul. 1986, pp. 1013–1014.

D. Eimerl Et Al., "Optical, Mechanical, and Thermal Properties of Barium Borate," J. Appl. Phys., 62 (5), Sep. 1, 1987, pp. 1968–1983.

(List continued on next page.)

Primary Examiner—John D. Lee
(74) Attorney, Agent, or Firm—Oblon, Spivak, McClelland, Maier & Neustadt, P.C.

(57) ABSTRACT

To obtain a laser beam the wavelength of 200 nm or less the repetition frequency of which is high, to reduce damage applied to mineral material such as synthetic fused silica, to extend the life of a stepper and others, to extend the life of laser parts without using toxic gas, to enhance the throughput of a stepper and others by enabling the compatibility of a high repetition frequency with the stability of a pulse, to realize an ultraviolet radiation source the whole of which is composed of a solid and to solve the problems of reliability, size, maintenance, a plumbing and others and sufficiently enhance reliability, the following procedure is taken. A second harmonic with the wavelength of 532 nm is acquired by converting the wavelength of a laser beam with the wavelength of 1.06 $\mu$m from a laser, a fourth harmonic with the wavelength of 266 nm is acquired by further converting the wavelength of the laser beam, a laser beam with the wavelength of approximately 700 nm is acquired by oscillating a titanium sapphire laser using a laser beam with the wavelength of 532 nm acquired by converting the wavelength of the above second harmonic or a laser beam from the above laser and a laser beam with the wavelength of approximately 190 nm is acquired by mixing the above laser beam and the laser beam with the wavelength of 266 nm on a nonlinear crystal in a laser to be a sum frequency.

32 Claims, 6 Drawing Sheets

U.S. PATENT DOCUMENTS

| | | | | |
|---|---|---|---|---|
| 5,640,405 | * | 6/1997 | Wallace et al. | 372/21 |
| 5,740,190 | * | 4/1998 | Moulton | 359/328 X |
| 5,742,626 | * | 4/1998 | Mead et al. | 372/22 |
| 5,805,626 | * | 9/1998 | Komatsu et al. | 359/328 X |

OTHER PUBLICATIONS

P. Moulton, "New Developments in Solid–State Lasers," Laser Focus, vol. 14, May 1983, pp. 83–88.

W. Koechner, "Solid–State Laser Engineering," Springer–Verlag Publishers, Copyright 1976, 1988, pp. 76–79.

V. Dmitriev Et Al., "Handbook of Nonlinear Optical Crystals," Springer–Verlag Publishers, Copyright 1991, pp. 100–103.

V. Dmitriev Et Al., "Handbook of Nonlinear Optical Crystals," Springer–Verlag Publishers, Copyright 1991, 1997, pp. 68–77.

Kobayashi (Editor), "Solid State Laser Measuring Method," vol. 37, Japan Spectral Society Publishing Center, 1997, pp. 60–71.

* cited by examiner

FIG. 6

CHARACTERISTICS OF SOLID STATE LASER MATERIAL OSCILLATED AT ROOM TEMPERATURE
(EXTRACT FROM PAGE 62 OF MEASURING METHOD SERIES V. 37, "SOLID STATE LASER" EDITED BY MR. KOBAYASHI & PUBLISHED IN 1997 BY JAPAN SPECTRAL SOCIETY PUBLISHING CENTER)

| HOST CRYSTAL (TITLE) | STIMULATED EMISSION CROSS SECTION $\sigma_d$ ($\times 10^{-20}$ cm$^2$) | FLUOROPHOR LIFE $\tau$ ($\mu$s) | HEAT CONDUCTION COEFFICIENT (W/cm K) | OSCILLATING WAVELENGTH (nm) | EXCITATION METHOD (OSCILLATION MODE) |
|---|---|---|---|---|---|
| $Cr^{3+}$:BeAl$_2$O$_4$ (ALEXANDRITE) | 1.0~5.0 | 220 | 0.23 | 730~805 / 751 | FLASH LAMP (PULSE) / LD (CW) |
| $Cr^{3+}$:LiCaAlF$_8$ (LiCAF) | 2.8 | 170 | 0.05 | 720~840 / 795 | FLASH LAMP (PULSE) / LD (CW) |
| $Cr^{3+}$:LiSrAlF$_8$ (LiSAF) | 4.8 | 67 | 0.05 | 780~1010 / 850~935 | FLASH LAMP (PULSE) / LD (CW) |
| $Cr^{4+}$:Gd$_3$Sc$_2$Ca$_3$O$_{13}$ (GSGG) | ~0.1 | 115 | 0.06 | 745~820 | FLASH LAMP (PULSE) / Kr LASER (CW) |
| $Co^{3+}$:MgF$_2$ | ~0.15 | 37 (210, -48°C) | | 1750~2500 | YAG LASER (PULSE) (1338nm) |
| $Cr^{4+}$:Mg$_3$SiO$_4$ (FORESTELITE) | ~2 / 1.5 | 3.6 / 2.7 | 0.13 | 1200~1320 / 1167~1345 | YAG LASER (CW) / YAG LASER (PULSE) |
| $Cr^{4+}$:YAG | 40 | ~4 | | 1340~1540 | YAG LASER (PULSE) / YAG LASER (CW) |
| $Ti^{3+}$:Al$_2$O$_3$ (TITANIUM SAPPHAIRE) | 30 | 3.2 | 0.35 | 660~1100 | YLF LASER (PULSE) / FLASH LAMP (PULSE) |
| $Ti^{3+}$:BeAl$_3$O (TITANIUM CHRYSOBERYL) | 0.6 | 6.0 | 0.23 | 730~950 | |
| $Nd^{3+}$:YAG | 40 | ~230 | 0.13 | 1064 | |
| $Nd^{3+}$:glass (Phosphate) | 4.0 | ~350 | 0.0019 | 1053 | |

WAVELENGTH CONVERTER

BACKGROUND OF THE INVENTION

1. Field of the Invention

The present invention relates to a wavelength converter for converting the wavelength of an incident laser beam and generating a laser beam with a specific wavelength.

2. Description of the Related Art

Generally, a laser beam has characteristics that as the frequency is higher than that of an electric wave, it is excellent in information storage capacity, as the wavelength is equal and a laser beam is in phase, a laser beam is excellent in monochromaticity and directivity, has coherence which is not seen for a normal beam and further, as a laser beam can be extremely thinly focused, energy is focused on a minute area and high temperature and high voltage can be locally and instantaneously realized, and a laser beam is applied to many fields such as communication, information, instrumentation, processing technique and medical science.

For example, it is considered that in a stepper used for manufacturing a semiconductor device, an argon fluoride laser which oscillates by a pulse 193 nm in wavelength will be used in the future. However, for the argon fluoride laser, it is difficult to increase a repetition frequency so that it is a few kHz or more with reduced peak power. Efforts toward widening pulse length are made, however, currently it is not achieved.

Therefore, light intensity and light energy density on synthetic fused silica used in a stepper are required to be a fixed value or less so as to prevent the deterioration of transmissivity and the thermal gradient due to polarization and absorption, and to prevent compaction and aberration due to the occurrence of local optical path differences. Therefore, a demand for the performance of a laser such as the stabilization of pulse energy becomes extremely severe and the sensitivity of a photoresist is required to be enhanced. As a fixed number of pulses are required to be radiated to equalize optical density, it is difficult to enhance throughput.

As toxic gas required to be frequently replaced is used in an argon fluoride laser and the life of each high-priced unit constituting the laser is short, the maintenance cost is high.

In the meantime, a technique for generating an ultraviolet ray 194 nm in wavelength which is a continuous wave for a laser trap for confining a mercury ion is described on p. 4159 in Vol. 36 of Applied Optics written by D. J. Berkeland et al. and published in 1997. That is, this document describes a case that a sum frequency 194 nm in wavelength is generated by approximately 2 mW by radiating a second harmonic 257 nm in wavelength from an argon ion laser 515 nm in wavelength and an amplified laser beam 792 nm in wavelength from a semiconductor laser on a crystal of β-barium borate (BBO) ($\beta$-$BaB_2O_4$). In this case, the BBO crystal is arranged in a position shared by both an external resonator which resonates with light 257 nm in wavelength and an external resonator which resonates with light 792 nm in wavelength and the optical paths of the two external resonators are spatially separated utilizing a difference in an angle of refraction by dispersion of the BBO crystal cut at Brewster's angle.

However, the above defects cannot be avoided by the above well-known technique when an argon fluoride laser is used, the apparatus is large-sized because an external resonator is used, reflectance and transmissivity are deteriorated because of adhesion of impurities to the surface of a mirror and others and output readily becomes unstable because of the misalignment of a mechanism. In addition, circuits for simultaneously locking external resonators with two wavelengths and actuators are required to be provided in only a step for generating a sum frequency and facilities for strictly matching the optical path length of the resonator are essential to lead light into the resonator.

If a higher harmonic from a solid state laser which can generate a high repetition frequency in place of an argon fluoride laser is used, the problems of the damage of synthetic fused silica and others and the cost are reduced. However, as an acquired wavelength is generally different from a wavelength generated by the argon fluoride laser, there is a defect that the above solid state laser is incompatible with the preceding argon fluoride laser.

SUMMARY OF THE INVENTION

The object of the present invention is to provide a wavelength converter (particularly a laser beam generator) wherein the above defects are solved, a laser beam the repetition frequency of which is high and which has a wavelength 200 nm or less is acquired and damage applied to mineral material such as synthetic fused silica is reduced, the life of a device such as a stepper is extended, the life of laser parts is extended without using toxic gas, the throughput of a stepper and others is enhanced with a high repetition frequency and the stability of a pulse compatible, an ultraviolet radiation source the whole of which is composed of a solid is realized, the problems of reliability, size, maintenance and plumbing and others can be solved and can be sufficiently enhanced. Another object is to provide a laser beam source with the same wavelength to evaluate a system in which such devices are utilized.

That is, the present invention relates to a wavelength converter provided with a first laser for generating a laser beam with a first wavelength (particularly between 1 and 1.1 μm), a wavelength converting section for converting the wavelength of the laser beam with the first wavelength from the first laser and generating a laser beam with a second wavelength (particularly between 500 and 550 nm) which is shorter than the first wavelength, a wavelength converting section for converting the wavelength of the laser beam with the second wavelength and generating a laser beam with a third wavelength (particularly between 250 and 275 nm) which is shorter than the second wavelength, a second laser which receives the laser beam with a wavelength between 500 and 550 nm and oscillates at a fourth wavelength (particularly between 650 and 785 nm) which is shorter than the first wavelength and is longer than the second wavelength and a wavelength converting part for generating a laser beam with a fifth wavelength (particularly between 190 and 200 nm) which is shorter than the third wavelength by mixing the laser beam with the third wavelength and the laser beam with the fourth wavelength in the second laser.

According to the wavelength converter according to the present invention, as a laser beam (a second higher harmonic) with the second wavelength is acquired by converting the wavelength of a laser beam with the first wavelength from the first laser, a laser beam with the third wavelength (a fourth higher harmonic) is acquired by further converting the wavelength of the laser beam, the second laser is oscillated using the laser beam with the second wavelength for example, a laser beam with the fourth wavelength is acquired and a laser beam with the fifth wavelength is acquired by mixing the laser beam with the fourth wavelength and the laser beam with the third wavelength in the second laser, the following remarkable effects (1) to (4) can be produced. Another light source can be also utilized for exciting the second laser.

(1) A laser beam with the fifth wavelength (particularly 200 nm or less) the repetition frequency of which is high can be acquired, and hereby, damage applied to mineral material such as synthetic fused silica is reduced and the life of a device such as a stepper can be extended.

(2) As an infrared solid state laser can be used for the first laser, such toxic gas as used in an argon fluoride laser is not required to be used and the life of laser parts can be extended.

(3) As a laser beam with the third wavelength and a laser beam with the fourth wavelength are mixed in the second laser (that is, in its internal resonator), a high repetition frequency and the stability of a pulse or average power are readily compatible and the throughput of a stepper and others can be enhanced.

(4) A locking and an actuator required in the case of an external resonator are not always required by automatically resonating only one wavelength in generating a sum frequency without using an external resonator and even if an actuator for controlling a wavelength is used, facilities for strictly matching with the optical path length of a resonator to lead a beam into the resonator are not always required. Therefore, an ultraviolet radiation source the whole of which is composed of a solid is realized, the problems of reliability, size, maintenance, plumbing and others can be solved and can be sufficiently enhanced.

BRIEF DESCRIPTION OF THE DRAWINGS

FIG. 6 compares various solid state laser materials and characteristics.

DESCRIPTION OF THE PREFERRED EMBODIMENTS

Figure 1:
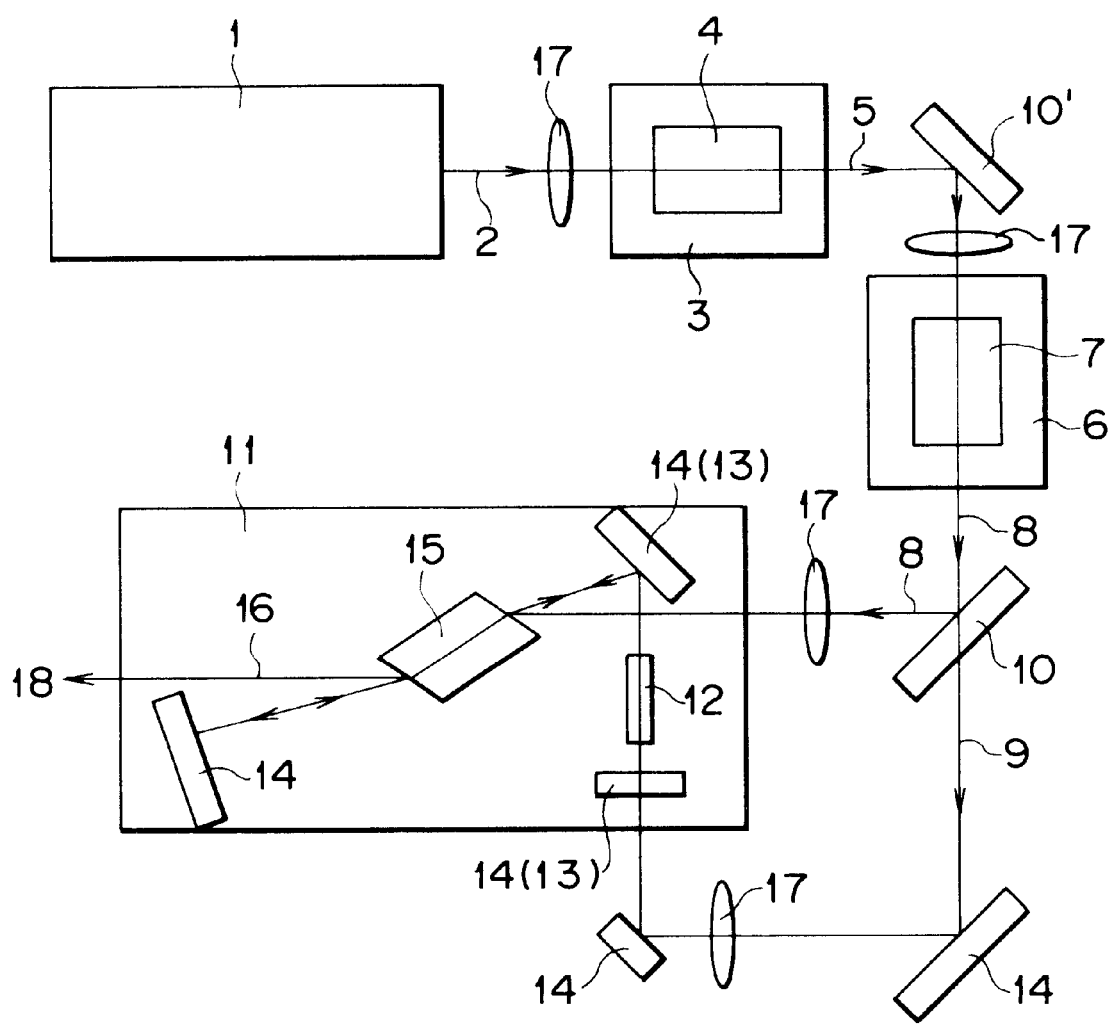
FIG. 1 is a schematic drawing showing the main part of a laser beam gerator equivalent to a first embodiment of the present invention.

In a wavelength converter according to the present invention, an optical pulse or wave with a third wavelength which is the fourth higher harmonic of a laser beam output from a first laser and an optical pulse or wave with a fourth wavelength acquired from a second laser may be held sufficiently overlapped spatially and in time in a nonlinear optical crystal equivalent to a wavelength converting part for generating a laser beam with a fifth wavelength by mixing the above optical pulses or waves to be a sum frequency.

A a feedback circuit may be also used so that an optical pulse or wave with the third wavelength which is the fourth harmonic of a laser beam output from the first laser and an optical pulse or wave with the fourth wavelength acquired from the second laser are held sufficiently overlapped spatially and in time in the nonlinear optical crystal equivalent to the above wavelength converting part for generating a laser beam with the fifth wavelength by mixing the above optical pulses or waves to be a sum frequency, and in case of pulses, utilizing delay due to an optical path difference between the optical pulse with the third wavelength and the optical pulse with the fourth wavelength or the delay of a trigger of a Q-switched laser.

The above first laser may be also a Q-switched laser such as a Q-switched laser to which injection seeding is applied.

Also, the first laser is a Q-switched laser and the second laser may be also excited by a continuous wave.

The second laser oscillates a continuous wave or the first laser and the second laser are both continuous wave (CW) lasers and for example, the first laser and the second laser may be also both CW lasers which may oscillate by a single frequency.

An injection locking or injection seeding may be applied to the second laser using an injection laser (a master laser) in which injection output may be variable.

It is desirable that the fifth wavelength acquired by mixing a sum frequency is 193.3 (the center wavelength of argon fluoride laser emission) ±0.2 nm and the wavelength of an outgoing beam with the fifth wavelength is 20 pm (picometer) or less and it is further desirable that the above wavelength is 0.05 pm or more and is 1 pm or less.

It is desirable that wave length selecting means is provided in the second laser.

It is desirable that the first laser used for the present invention is provided with a solid state laser medium including a rare earth ion such as a neodymium ion and a ytterbium ion, and the first laser may be provided with any medium of Nd(neodymium): YAG (yttrium-aluminum-garnet), Nd: YVO, Nd: YLF, Nd: Glass and Yb: YAG which respectively oscillate at 1064 nm ±20 nm for example and at 1030 nm or so. The first laser may be also a laser including a solid state laser medium including a neodymium ion and which is excited by a semiconductor laser or multiple semiconductor lasers.

The second laser can be excited by radiating a laser beam with the second wavelength 500 nm or more and 550 nm or less in wavelength acquired by converting the wavelength of a laser beam output from the first laser.

It is desirable that the second laser is provided with a laser medium including a titanium ion or a chromium ion, and the second laser may be provided with a titanium doped sapphire crystal, Cr:LiSAF, Cr:LiCAF or an alexandrite crystal for example.

It is also desirable that the second laser is provided with a nonlinear optical crystal used for an optical parametric process. It is desirable that a laser beam with the second wavelength is the second harmonic of a laser beam oscillated by the first laser and a laser beam with the third wavelength is the fourth harmonic of a laser beam oscillated by the first laser.

It is desirable that the above wavelength converting section for receiving a laser beam with the second wavelength and outputting a laser beam with the third wavelength is provided with at least one BBO crystal and the above wavelength converting part for receiving a laser beam with the third wavelength and a laser beam with the fourth wavelength and outputting a laser beam with the fifth wavelength is provided with at least one BBO crystal.

It is desirable that the above wavelength converting part for outputting a laser beam with the fifth wavelength is provided with at least one nonlinear optical crystal on which a laser beam is incident at Brewster angle or approximately at the above angle.

It is desirable that the second laser is provided with at least one BBO crystal or one CLBO ($CsLiB_6O_{10}$) crystal, and for example, phase matching is possible at an angle between 70° to 90°, or preferably 70° to 80°, or more preferably 70° to 77° with an axis c of the above BBO crystal.

Also, it is desirable that the second laser is provided with both a titanium sapphire crystal and a BBO crystal.

The wavelength converter according to the present invention can be utilized for a laser beam wavelength converter in the field of optical electronics such as a wavelength converter for a stepper, an optical disc, an apparatus for manufacturing an optical master disc, semiconductor inspection equipment and a laser printer.

Next, referring to the drawings, preferred embodiments of the present invention will be described.

FIG. 1 shows a laser beam generator in a first embodiment of the present invention.

The laser beam generator equivalent to this embodiment generates a second harmonic based upon infrared light 1064 nm in wavelength output from one Nd: YAG laser put on the market for example, generates a fourth harmonic using the second harmonic and uses an unconverted second harmonic for exciting a titanium sapphire laser. Further, the above laser beam generator radiates the fourth harmonic on a BBO crystal arranged in a resonator of the titanium sapphire laser and generates ultraviolet rays approximately 193 nm in wavelength which efficient utilizes the strong intensity in the resonator of a titanium sapphire laser beam. As desired ultraviolet rays can be effectively generated by one laser put on the market, the laser beam generator is advantageous in cost and efficiency. An example in which a Nd: YAG Q-switched pulse laser is used will be described below. However, a the similar configuration may be also adopted for a CW laser except a section related to the timing of a pulse and the above Nd: YAG Q-switched pulse laser can be also applied to lasers other than a Nd: YAG laser and to other nonlinear optical crystals in addition to a BBO crystal.

The configuration of the laser beam generator shown in FIG. 1 will be described below. A reference number 1 shown in FIG. 1 denotes a Q-switched Nd: YAG laser which oscillates at the wavelength of 1.06 $\mu$m (1060 nm), an outgoing beam 2 from the laser is led to a wavelength converting section 3 via an optical lens 17 and is converted to a second harmonic 5 with the wavelength of 532 nm by a nonlinear optical crystal shown by a reference number 4 such as LBO ($LiB_3O_5$) there.

Further, the output beam is converted to a fourth higher harmonic 8 with the wavelength of 266 nm using a nonlinear optical crystal 7 such as BBO in a wavelength converting section 6 after a fundamental wave 1.06 $\mu$m in wavelength is separated by a dichroic mirror 10' if necessary. Currently, there are many reports that a fourth harmonic with an average output of 1 W or more is acquired from an Nd: YAG laser with an output of 5 to 10 W on average and it is estimated that an output of 10 W or more will be required in future.

A part of the second harmonic 5 is converted to the fourth harmonic 8. However, a part 9 is not converted. These are separated by a polarizer or the dichroic mirror 10. A titanium sapphire laser 11 is excited using the second harmonic 9.

Figure 2:
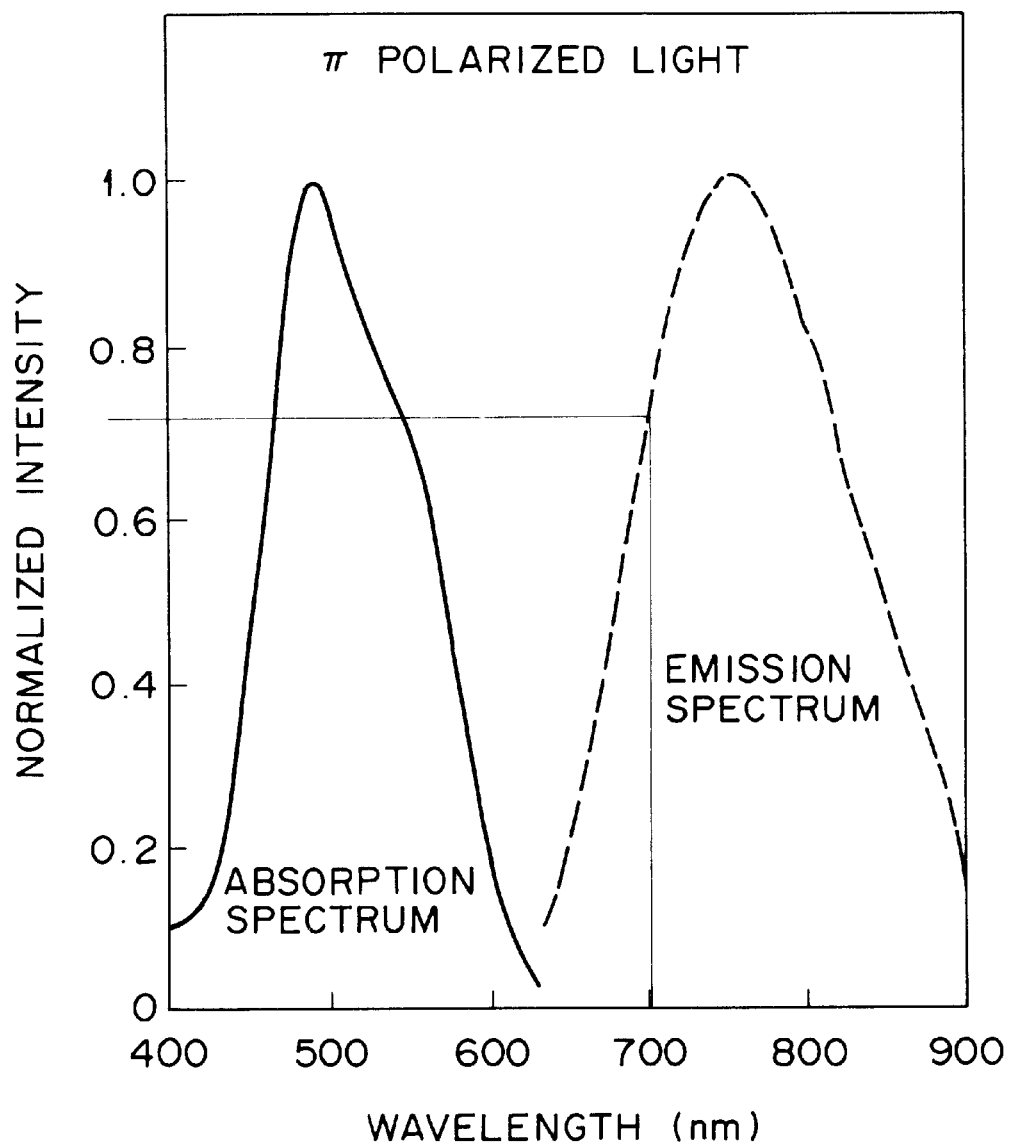
FIG. 2 is a spectral atlas showing the characteristics of the absorption and emission of titanium sapphire used for the laser beam generator.

A reference number 12 denotes a titanium sapphire crystal and the titanium sapphire crystal is provided with the absorption and emission characteristics shown in FIG. 2. (Refer to "Solid State Laser Engineering" 2nd. Ed. written by W. Koechner and published in 1988 by Springer Verlag.) The above titanium sapphire crystal can be oscillated with a wavelength of approximately 700 nm by suitable wavelength selecting means 13 such as a grating, a prism, an etalon and injection seeding. If a mirror 14 forming a resonator (a laser) provided with high reflectance at the above wavelength (approximately 700 nm) is used, the titanium sapphire laser 11 efficiently oscillates and the internal power is extremely increased.

In the resonator 11, ultraviolet rays 18 with the wavelength of approximately 190 nm can be efficiently generated by leading the fourth harmonic 8 using the mirrors 10 and lens 17 and others and generating a sum frequency 16 on a nonlinear optical crystal 15 such as BBO (by adjusting time so that timing is matched in the case of a pulse). To match the timing of pulses, it is considered for simple examples that an optical path length is extended by providing a mirror not shown between the mirror 10 and the BBO crystal 15 and the rise time of the titanium sapphire laser 11 is reduced. For stabilization, as described later, a method of matching the timing of the switches of two lasers by delay of a trigger pulse is also effective.

In an example shown in FIG. 1, the nonlinear optical crystal 15 is cut at Brewster's angle, the reflection on the surface of an incident beam is prevented and simultaneously, the synthesis of incident beams with two wavelengths and the selection of a wavelength for oscillating the titanium sapphire laser can be simultaneously executed because of its dispersion characteristics.

If a Nd: YAG laser for generating a continuous wave 1064 nm in wavelength or a Nd: YAG laser for generating the second harmonic normally 532 nm in wavelength of a continuous wave is used for the first laser 1, an efficiency of conversion can be also enhanced by applying a method of converting a wavelength using an external resonator to the wavelength converting part. To generate a sum frequency, the end face of the BBO crystal 15 is, for example, cut at Brewster's angle and plural beams with respective wavelengths are synthesized and dispersed. However, a similar purpose can be also achieved using a dichroic mirror, a grating and a prism and the present invention is not limited to the configuration shown in FIG. 1. A wavelength and others may be limited depending upon an applied field and in this case, for the first laser, a single frequency laser, its amplification laser, a Q-switched laser to which injection seeding is applied or a single frequency laser to which an injection locking is applied is required to be used.

Figure 3:
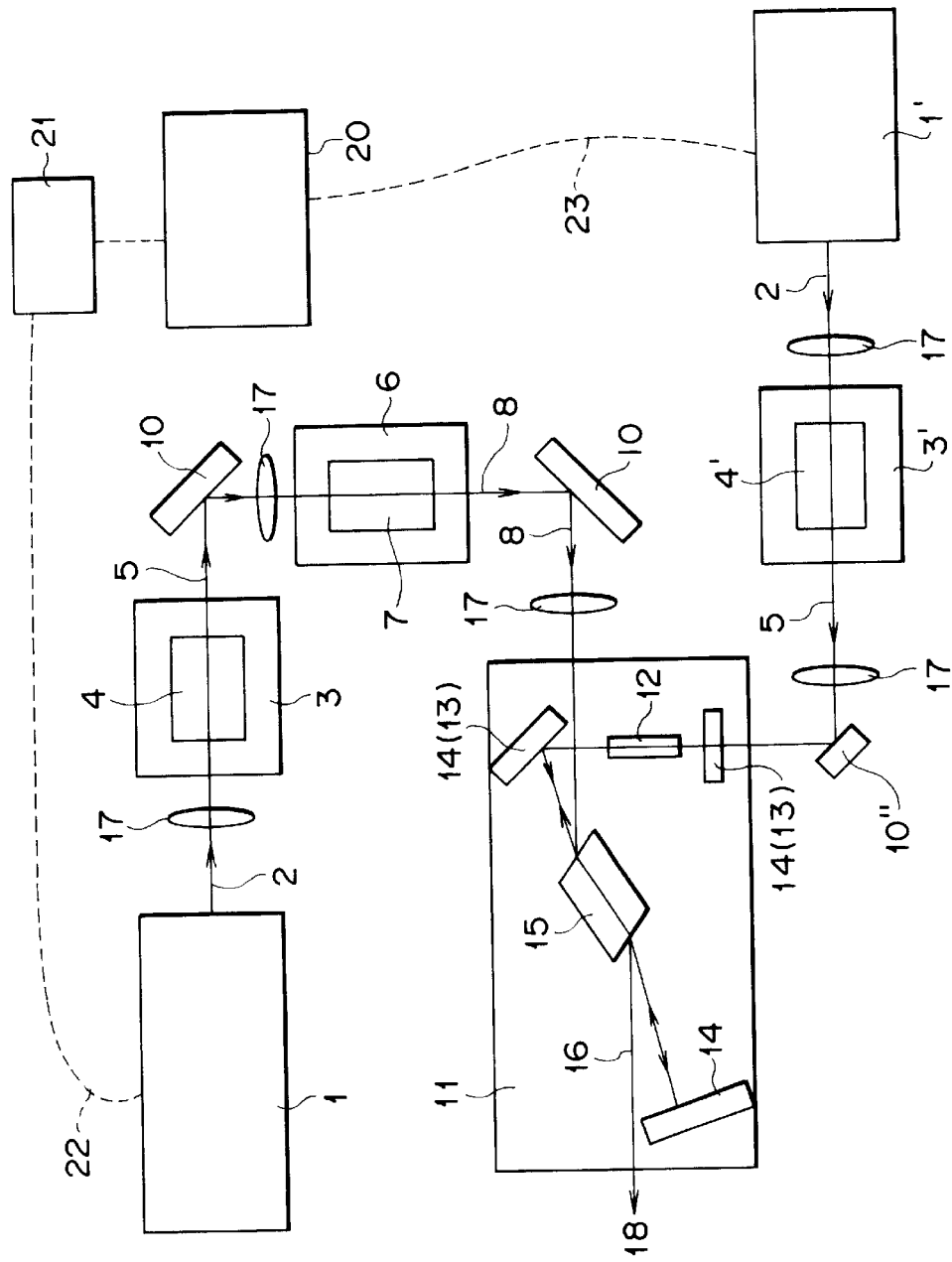
FIG. 3 is a schematic drawing showing the main part of a laser beam generator equivalent to a second embodiment of the present invention.

FIG. 3 shows a laser beam generator equivalent to a second embodiment of the present invention.

The laser beam generator equivalent to this embodiment is a device for generating an ultraviolet ray approximately 190 nm in wavelength using two Q-switched lasers for example. A reference number 20 in FIG. 3 denotes a trigger pulse generator such as a pulse generator and a trigger pulse generated by the trigger pulse generator 20 is output in two directions. Further, timing jitter and a timing difference between pulses from two Q-switched lasers can be also reduced by equalizing a radio-frequency (RF) signal respectively input to the two Q-switched lasers.

That is, the above signal is input to a Q-switched laser 1' which is a Nd: YAG laser via a cable 23 as an external trigger and in the meantime, a trigger pulse toward a Q-switched laser 1 is input to a Q-switched laser 1 via a cable 22 after delay is applied by a delay generator 21. The trigger pulse generator 20 may be also built in the Q-switched laser 1', delay is applied to the output by the delay generator 21 and the pulse may be also input to the Q-switched laser 1. According to either method, the Q-switched laser 1 outputs a Q-switched pulse which is triggered by applying a fixed delay (or a fixed advance or variable delay to minimize a timing difference) to the trigger output of the Q-switched laser 1' or a trigger pulse sent to the Q-switched laser 1'.

A beam 2' output from the Q-switched laser 1' is converted to a second harmonic 5' by a wavelength converting element 4' such as a nonlinear optical crystal (e.g. LBO) arranged in a wavelength converting section 3'. After a fundamental wave 1.06 μm in wavelength is separated from the second harmonic 5' by a dichroic mirror 10" if necessary, the left second harmonic is used for pumping a titanium sapphire laser 11 composed of plural mirrors 14 and a titanium sapphire crystal 12. The titanium sapphire laser 11 starts the oscillation of a pulse after a rise time which varies depending upon a condition elapsing after a pumping pulse is input.

In the meantime, the output of the Q-switched laser 1 is converted to a second harmonic 5 by a wavelength converting element 4 such as a nonlinear optical crystal arranged in a wavelength converting section 3.

After a fundamental wave 1.06 μm in wavelength is separated from the second harmonic 5 by a dichroic mirror 10' if necessary, the left second harmonic is converted to a fourth harmonic 8 by a wavelength converting element 7 such as a nonlinear optical element such as BBO arranged in the next wavelength converting section 6. The dichroic mirror 10 is set if necessary so that it has a function for selectively reflecting the fourth harmonic.

A titanium sapphire laser 11 is composed of parallel planes, however, both planes maybe also cut at Brewster's angle. In FIG. 3, a wavelength converting element 15 such as BBO may be cut at Brewster's angle and may be provided with a function for synthesizing or separating beams different in wavelength, however, the wavelength converting element 15 with parallel planes and an element such as a prism, a dichroic mirror and a grating may be also combined.

To efficiently mix a sum frequency in the wavelength converting element 15 and acquire a desired short wavelength beam 18, an output as a sum frequency is approximately in proportion to the product of the intensity of the fourth higher harmonic 8 and the intensity of a pulse in the resonator of the titanium sapphire laser 11, and the time of pulses which reach the wavelength converting element 15 is required to be approximately equal.

If the quantity of delay by the delay generator 21 is τ, a difference (the delay of 1' to 1) in transmission time via the cable between triggers is τ0, a difference (the delay of 1' to 1) in rise time between the two lasers 1 and 1' is τ1, a difference (the delay of 1' to 1) in time due to a difference in the propagation distance of a beam from the generation of a pulse to the wavelength converting element 15 is τ2 and the rise time of the titanium sapphire laser 11 is τ3, the titanium sapphire laser 11 is actuated in "τ0+τ1+τ2+τ3−τ" since the fourth harmonic 8 reaches the wavelength converting element 15 and the above fourth harmonic reaches the wavelength converting element 15.

The typical value Δt of a Q-switched pulse length is between 5 and 100 nanoseconds and if τ0+τ1+τ2+τ3−τ>Δt, the efficiency is deteriorated because the passing time of two pulses becomes off. However, when (τ0+τ1+τ2+3−τ) is close to 0, the overlap of two pulses is increased and the efficiency of conversion in the wavelength converting element 15 can be enhanced.

Therefore, cable delay may be also applied to a trigger pulse so that τ0=τ−τ1−τ2−τ3 or optical path difference may be also set so that τ2=τ−τ0−τ1−τ3 and there are further plural approaches depending upon the combination used. However, once the laser is assembled, it is often easier to electrically control the delay quantity τ of the delay generator 21 than to vary τ0, τ1 and τ2. That is, τ (normally >0) has only to be set so that τ=τ0+τ1+τ2+τ3.

Further, a polarized error signal is generated by a method of applying a small oscillation to the phase delay quantity τ and others so that an outgoing beam 18 is the most stable and when a feedback circuit always including a delay quantity τ is set hereby, the outgoing beam 18 can be stably maximized.

In addition, τ3 is reduced by applying injection seeding to the titanium sapphire laser 11 using a laser of low output which oscillates at a desired wavelength and the output 18 can be stably maximized by varying the luminous energy and the frequency of a seed laser.

In the examples shown in FIGS. 1 and 3, a standing-wave resonator can be given as the titanium sapphire laser resonator 11, however, a ring resonator may be also used. Particularly, if a ring resonator in which a beam can be forced to advance in one direction is used, it is estimated that an effect will be also produced in stability and enhancement of efficiency. A nonlinear optical crystal and others used in a laser and for converting a wavelength can be also selected variously alternatively to the above example.

In the above both laser beam generators equivalent to each embodiment of the present invention, as the second harmonic 5 with the wavelength of 532 nm is acquired by converting the wavelength of a laser beam 2 with the wavelength of 1.06 μm from the laser 1, the fourth harmonic 8 with the wavelength of 266 nm is acquired by further converting the wavelength of the laser beam, a laser beam with a wavelength of approximately 700 nm is acquired by oscillating the titanium sapphire laser 11 using the laser beam 5' with a wavelength of 536 nm acquired by converting the wavelength of the above second higher harmonic 5 or the laser beam 2' from the laser 1 and a laser beam 18 with the wavelength of approximately 190 nm is acquired by mixing the above laser beam and the laser beam 8 with the wavelength of 266 nm on the nonlinear optical crystal 15 in the laser 11 to be a sum frequency, the following remarkable effects (1) to (4) can be produced.

(1) The laser beam 18 the repetition frequency of which is high and the wavelength of which is 200 nm or less can be acquired, and hereby, damage applied to mineral material such as synthetic fused silica can be reduced and the life of a stepper and others can be extended.

(2) As an infrared solid state laser can be used for a laser, such toxic gas as in an argon fluoride laser is not required to be used and the life of laser parts can be extended.

(3) As the laser beam 8 with the wavelength of 266 nm and the laser beam with the wavelength of 700 nm are mixed to be a sum frequency in the laser 11 (that is, in an internal resonator), a high repetition frequency and the stability of pulses are readily compatible and the throughput of a stepper and others can be enhanced.

(4) Such a locking and an actuator as in the case of an external resonator are not required by automatically resonating only one wavelength in generating a sum frequency without using an external resonator, even if an actuator for controlling a wavelength is used, facilities for strictly matching with the optical path length of a resonator to lead light into the resonator are not required. Therefore, an ultraviolet radiation source the whole of which is composed of a solid is realized, and the problems of reliability, size, maintenance and the plumbing and others can be solved and can be sufficiently enhanced.

Next, the above wavelength converting element will be described, giving concrete components and the numerical values of each material.

A case that a Nd: YAG laser oscillated at 1064 nm is used for a laser, a titanium sapphire laser is used for a laser oscillated at approximately 700 nm, LBO ($LiB_3O_5$) is used for generating a second higher harmonic and BBO ($\beta$-$BaB_2O_4$) is used for generating a fourth higher harmonic respectively as a nonlinear optical crystal and will be described below.

For a method of efficiently generating a second harmonic from the Nd: YAG laser using LBO, there is a method of phase matching at about room temperature type 1, however, there are drawbacks that the efficiency of conversion is a little reduced due to walk off and a symmetry property in the waveform of an output beam is reduced.

Figure 4:
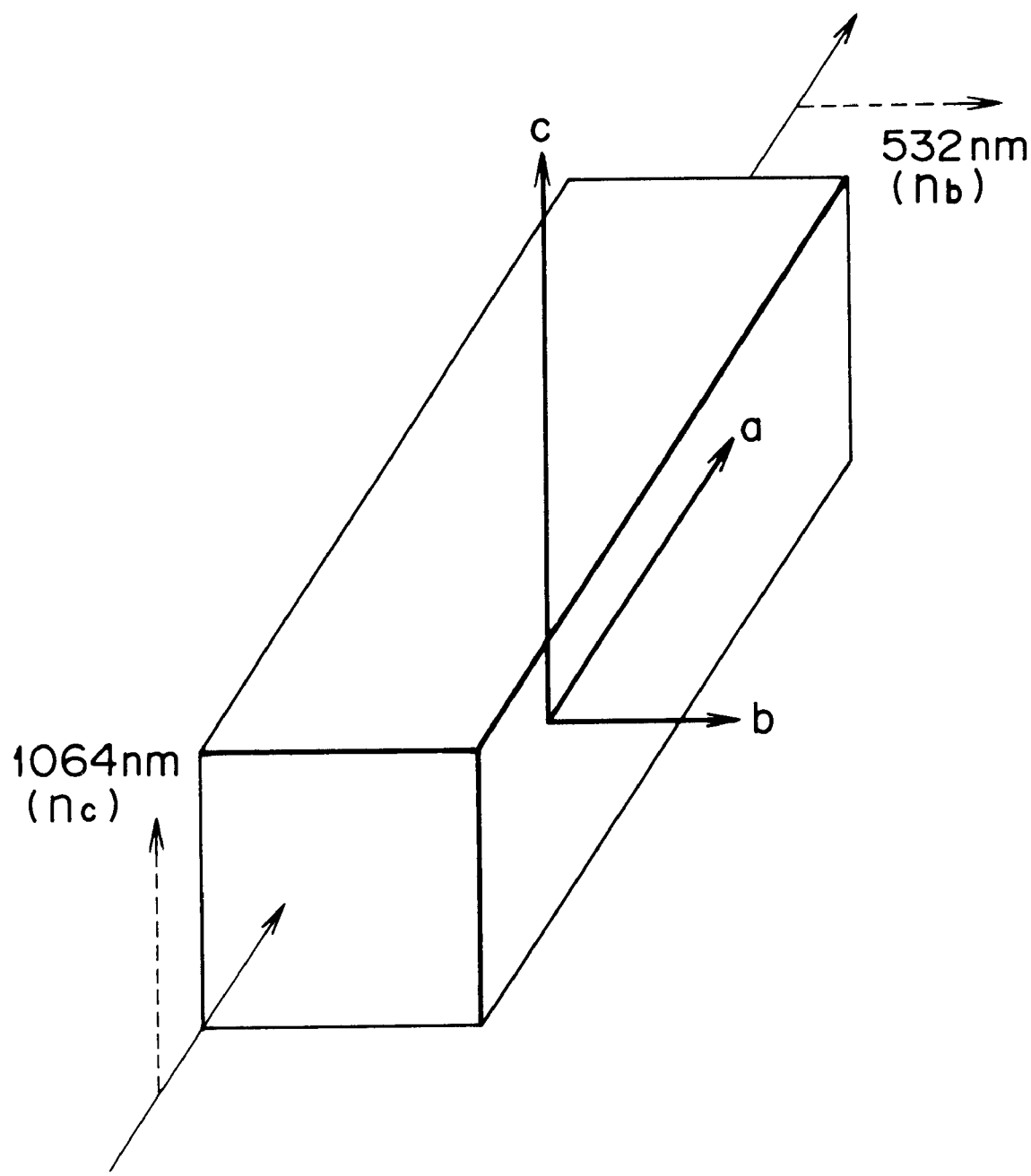
FIG. 4 is an explanatory drawing for explaining the generation of a second higher harmonic by an LBO crystal.

For a method of preventing them, a method of keeping an LBO crystal with it heated at approximately 150° C. and achieving type 1 non-critical phase matching is known (see FIG. 4). In the case of this method, the effect of walk off is reduced (eliminated), an efficient conversion of a wavelength is enabled and a symmetry property of the output beam with an incident beam is approximately kept.

The dispersion depending upon a wavelength of the refractive index of LBO is described on page 29 of JQE QE-30 No. 12 written by K. Kato and published in 1994 for example. If the refractive index of polarized light based upon a crystallographic b-axis with the wavelength of 1064 nm and the refractive index of polarized light based upon a c-axis with the wavelength of 532 nm are calculated based upon the above document, the result is as follows:

nb (1064)=nc (532)=1.6053 (at approximately 150° C.). The axes are selected in the order of a, c and b from a smaller refractive index in the case of the wavelength of 1064 nm. In the case of phase matching in this direction, referring to "Handbook of Nonlinear Optical Crystals" written by V. G. Dmitriev et al., edited by Springer-Verlag and published in 1991, the absolute value of an effective second order nonlinear optical constant deff is approximately $0.85 \times 10^{-12}$ m/V. In the example shown in FIG. 3, an oven for keeping the temperature at approximately 150° C. and others are omitted for simplification.

To maximize efficiency, the diameter of a beam in a crystal is required to be selected. This is described in detail on a page 3597 of "J. Appl. Phys., Vol. 39" written by J. D. Boyd and D. A. Kleinman and published in 1968 and U.S. Pat. No. 3,530,301. As the example shown in FIG. 3 is equivalent to a case that a parameter B is zero (a walk-off angle is zero) in these documents, efficiency becomes maximum when a focusing parameter $\xi$ is close to 2.84. However, as the degree in which its fundamental wave with the wavelength of 1064 nm is converted in a crystal, and depletes cannot be neglected in case the efficiency of the conversion of an input pulse exceeds approximately 20%, the slight deviation of an optimum value is observed. In the case of walk off, the optimum value further deviates, however, the above is described in Japanese patent application No. Hei 8-133669 applied by Shigeo Kubota and others.

Next, the generation of a fourth harmonic using BBO will be described. BBO is a uniaxial crystal and the dispersion depending upon an ordinary ray and an extraordinary ray of the refractive index (Sellmeier's equation) is described on page 1013 of "IEEE JQE Vol. QE-22" written by K. Kato and published in 1986 and others.

According to measured values and the data of temperature characteristics on a page 1968 of "J. Appl. Phys. Vol. 62" written by D. Eimerl et al. and published in 1987, if T is a degree centigrade, the above dispersion of the refractive index is as follows.

$n^2_x = 2.73628 + \{0.0188366/(\lambda^2 - 0.0174084)\} - 0.0142199\lambda^2 - 1.66 \times 10^{-5} (T-25)$ $n^2_z = 2.37061 + \{0.0127987/(\lambda^2 - 0.0153556)\} - 0.00337865\lambda^2 - 0.93 \times 10^{-5} (T-25)$ If temperature is close to ordinary temperature (T=25° C.), an angle $\theta$ (a phase matching angle) between an optical axis and the axis c as follows is approximately 47°.

[Expression 1]

$$n^\omega_e(\theta) = n^{2\omega}_o$$

A titanium sapphire laser uses a laser crystal in which titanium ions ($Ti^{3+}$) are doped in a sapphire crystal and as described on a page 83 of "Laser Focus Vol. 14" written by P. F. Moulton and published in May, 1983, a titanium sapphire laser absorbs a beam with the wavelength of approximately 400 to 600 nm and emits a beam with the wavelength of 650 to 1000 nm around 800 nm as shown in FIG. 2.

For example, to emit a beam with the wavelength of approximately 193 nm, a titanium sapphire laser is oscillated with the wavelength of approximately 700 nm according to the following expression.

$\lambda = 1/(1/266 - 1/193)$ (nm)

The wavelength of 700 nm is slightly off the center of an oscillation line as shown in FIG. 2 and gain equivalent to approximately a half of a peak is acquired.

A wavelength is selected using a prism for example. In addition, a birefringent filter, a grating, an etalon, a dichroic mirror and others are often combined. If the rise time is reduced by a pulse and control over a wavelength in a single mode and others are executed, it is effective that injection seeding is applied using a semiconductor laser in a single mode oscillated with a desired wavelength and others.

If a first infrared laser utilizes the oscillation of 1047 nm of an Nd: YLF laser, the wavelength of a fourth harmonic is 261.8 nm and the wavelength of a beam from a titanium sapphire laser is a value acquired according to the following expression, approximately 735 nm.

$\lambda = 1/(1/261.8 - 1/193)$ (nm)

As the wavelength is a little closer to the center of gain, gain is also increased and the above case is advantageous.

If a first infrared laser utilizes the oscillation of approximately 1030 nm of a Yb: YAG laser, the wavelength of a fourth higher harmonic is 257.5 nm and the wavelength of a beam from a titanium sapphire laser is a value acquired according to the following expression, approximately 770 nm and as the wavelength is further closer to the center of gain, the above case is advantageous.

$\lambda = 1/(1/257.5 - 1/193)$ (nm)

In a process for generating a laser beam with the wavelength of 193 nm at a final stage, BBO or CLBO ($CsLiB_6O_{10}$) is suitable. In the case of a repetition frequency which exceeds approximately 1 kHz of a continuous wave or a Q-switched pulse, BBO which is excellent in heat characteristics is suitable. In the meantime, it is said that in the case of pulsed light which is low in a repetition frequency, CLBO is suitable. In addition, there are crystals such as KB5, KBBF, SBBC, CBO and they may be used. First, a case in which BBO is used will be described.

For simplification, a case that a fourth higher harmonic based upon the oscillation of 1064 nm of an Nd: YAG laser and a laser beam with the wavelength of 266 nm are mixed in a titanium sapphire laser to be a sum frequency will be described.

This case is as follows at ordinary temperature based upon the above dispersion of a refractive index (Sellmeier's equation):

$n_0(266\ nm)=1.75737$ $n_0(703\ nm)=1.66396$ $n_e(193\ nm)=1.73191$ (The wavelength is extrapolated), and a phase matching angle is calculated to be approximately 73.5°. Considering the error of measurement and dispersion, if a range of approximately ±3.5° is applied, the phase matching angle is between 70° and 77°, and possibly 70° to 82° due to the larger error of Sellmeier's equation.

To enhance the efficiency of conversion, it is required to increase the intensity of near infrared radiation and deep-ultraviolet radiation. For one means, it is considered that a BBO crystal is arranged in the resonator of a titanium sapphire laser. To enhance efficiency, it is essential that a beam with the wavelength of 266 nm and a beam with the wavelength of approximately 700 nm (provided with a confocal parameter close to the respective beams if possible) are sufficiently overlapped in BBO.

An optical path of a titanium sapphire laser and the optical path of a beam with the wavelength of 266 nm are overlapped in BBO utilizing dispersion by cutting the end face of BBO at Brewster's angle for example and can be separated outside. A similar method is also utilized on a page 4159 of "Applied Optics Vol. 36" written by D. J. Berkeland et al. and published in 1997 and external resonators with two wavelengths are constituted. According to this method shown in FIG. 5, a beam with the wavelength of 266 nm is incident on BBO, oscillating the titanium sapphire laser and the efficiency of generation of a sum frequency can be enhanced. However, as light polarized by a face cut at Brewster's angle functions for the generated beam with the wavelength of 193 nm as s polarized light, reflection loss occurs and damage is caused depending upon the particular case.

Figure 5:
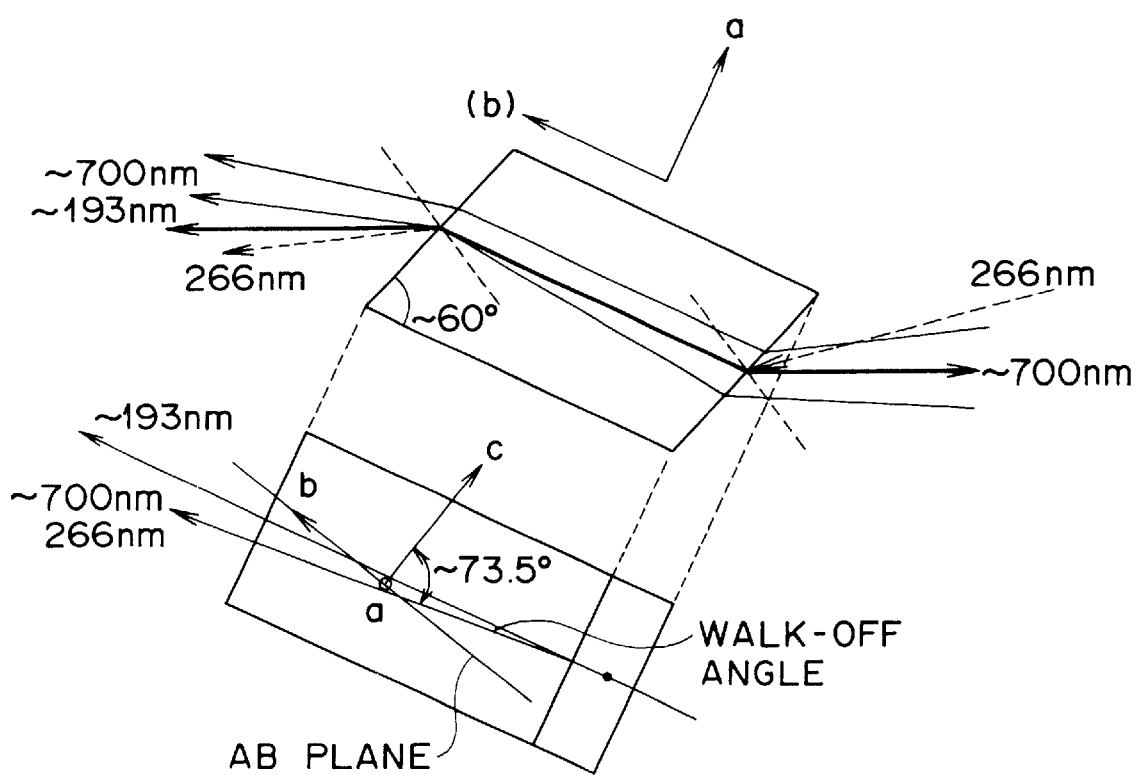
FIG. 5 is an explanatory drawing for explaining the mixing of a sum frequency on a BBO crystal cut at Brewster's angle.

FIG. 5 shows the appearance of beams in three wavelengths in relation to BBO cut at Brewster's angle. Differences between angles of refraction are shown with the difference a little exaggerated, compared with the actual difference. For the respective wavelengths, typical values are shown, however, when the wavelength of a fourth higher harmonic is short, the wavelength of a laser beam the wavelength of which is approximately 700 nm in FIG. 5 is varied up to approximately 785 nm to obtain a desired ultraviolet ray.

In addition, the above document describes a case that a second harmonic with the wavelength of 257 nm of an argon ion laser beam with the wavelength of 515 nm and an amplified semiconductor laser beam with the wavelength of 792 nm are incident on a BBO crystal and a sum frequency with the wavelength of 194 nm is generated of approximately 2 mW. The BBO crystal is arranged in a position shared by an external resonator which resonates with a beam with the wavelength of 257 nm and an external resonator which resonates with a beam with the wavelength of 792 nm. The optical paths of the two external resonators are separated utilizing difference between angles of refraction by dispersion on the BBO crystal cut at Brewsters angle. Therefore, at least a sum frequency generating means requires providing a circuit for simultaneously locking the external resonators with two wavelengths and an actuator.

In the meantime, in the wavelength converter according to the present invention, the generation of a fourth harmonic and the oscillation of the titanium sapphire laser are simultaneously executed utilizing a second harmonic from the solid state laser or lasers and BBO for generating a sum frequency is arranged in the resonator of the titanium sapphire laser. Therefore, a method according to the present invention is greatly different from a method in the above document in that two so-called external resonators are not simultaneously used and one wavelength is automatically oscillated in generating a sum frequency in addition having differences between a solid state laser and a gas laser and in that respective wavelengths are different. Owing to the above differences, the ultraviolet radiation source the whole of which is composed of solid materials can be realized and the wavelength converter according to the present invention is provided with suf ficient advantages in reliability, size, maintenance, plumbing and others. In addition, the above wavelength converter is also advantageous in that facilities for strictly matching optical path lengths with two external resonators, independently and/or simultaneously, to lead light into the resonator are not required.

Next, a case that the f irst laser is a laser other than a Nd: YAG laser will be described.

The wavelength of a fourth harmonic from an Nd: YAG laser oscillated with 1064 nm is 266 nm, to acquire an ultraviolet ray with the wavelength of 193.3 nm for example using the above fourth harmonic, the wavelength of a laser required to acquire a sum frequency in a final step is approximately 707 mm and a titanium sapphire laser is used.

In the meantime, if the oscillation of 1047 nm of an Nd: YLF laser for example is utilized, the wavelength of the fourth higher harmonic is 261.8 nm and the wavelength of a laser required to acquire a beam with the wavelength of 193.3 nm is approximately 739 nm. When a required wavelength is extended by approximately 30 nm, the types of available lasers are increased as shown in FIG. 6 (refer to a page 62 of "Solid state laser" of Measuring method series Vol. 37 edited by Mr. Kobayashi and published in 1997 by Japan Spectral Society publishing center), Cr: LiCAF for example and others are also available and advantages such as high efficiency particularly in generating a continuous wave can be utilized. However, though in the case of a continuous wave, the fluorescent life of a Cr ion laser is long and is excellent in efficiency, in the case of a pulse, rise time is often delayed.

Also, if a Yb: YAG laser is utilized with approximately 1030 nm, a fourth harmonic is 257.5 nm and an ultraviolet ray with the wavelength of 193.3 nm can be generated by a laser which oscillates with a wavelength of approximately 775 nm. As the efficiency of a laser such as a titanium sapphire laser and Cr: LiCAF is generally enhanced with approximately the above wavelength, there is an effect that the efficiency of a system is enhanced. FIG. 6 shows such appearance. As the energetic development of a Yb: YAG laser is started relatively recently and the laser is a pseudo-three level laser, the threshold and the dependency of oscillation efficiency upon temperature is often large.

Optical parametric oscillation may be also used in place of a titanium sapphire laser which oscillates with a wavelength of approximately 700 nm and others and in this case, there is an effect that rise time is reduced. If a resonator is constituted, a nonlinear optical crystal is arranged in it so that a beam is propagated in a direction in which a phase matching condition is met and the above nonlinear optical crystal is excited with a beam 532 nm in wavelength for example, a beam with the wavelength of approximately 700 nm and a beam with the wavelength of approximately 2 μm can be generated. As the reflectance of a mirror the reflectance of which is increased with 700 nm is normally also increased with its triple wavelength, the threshold of a parametric oscillator can be readily reduced.

The preferred embodiments of the present invention are described above. However, the present invention is not limited to the above embodiments.

According to the wavelength converter according to the present invention, as a laser beam with the second wavelength (a second harmonic) is acquired by converting the wavelength of a laser beam with the first wavelength from the first laser, a laser beam with the third wavelength (a fourth harmonic) is acquired by further converting the wavelength of the laser beam, a laser beam with the fourth wavelength is acquired by oscillating the second laser using the laser beam with the second wavelength and a laser beam with the fifth wavelength is acquired by mixing the laser beam with the fourth wavelength and the laser beam with the third wavelength to be a sum frequency in the second laser, a laser beam the repetition frequency of which is high and the wavelength of which is 200 nm or less can be acquired, damage applied to mineral material such as synthetic fused silica can be reduced, the life of a stepper and others can be extended, the life of laser parts can be extended because toxic gas and high peak power are not used, the throughput of a stepper and others can be enhanced with a high repetition frequency and the stability of a pulse compatible, an ultraviolet radiation source the whole of which is composed of a solid can be realized, the problems of reliability, size, maintenance, plumbing and others can be solved and reliability can be sufficiently enhanced.

What is claimed is:

1. A wavelength converter composed of all solid state material, comprising:
    a first pulsed laser with repetition frequency at least substantially 1 kHz for generating a laser beam with a first wavelength;
    a wavelength converting section for converting the wavelength of the laser beam with said first wavelength from said first laser and generating a laser beam with a second wavelengh shorter than said first wavelength;
    a wavelength converting section for converting the wavelength of the laser beam with said second wavelength and generating a laser beam with a third wavelength shorter than said second wavelength;
    a second laser including, a resonator on which a laser beam with a wavelength between 500 and 550 nm is incident and which oscillates with a fourth wavelength shorter than said first wavelenghth and longer than said second wavelength; and
    a wavelength converting part for mixing the laser beam with said third wavelength and the laser beam with said fourth wavelength in said second laser to be a sum frequency and generating a laser beam with a fifth wavelength shorter than said third wavelength,
    said first laser for amplifying light with said first wavelength between 1 and 1.1 μm and generating a laser beam;
    a wavelength converting section for converting the wavelength of the laser beam with said first wavelength from said first laser and generating a laser beam with said second wavelength between 500 and 550 nm;
    a wavelength converting section for converting the wavelength of the laser beam with said second wavelength between 500 and 550 nm and generating a laser beam with said third wavelength between 250 and 275 nm;
    said second laser on which the laser beam with a wavelength between 500 and 550 nm is incident and which oscillates with said fourth wavelength between 650 and 785 nm; and
    a wavelength converting part disposed inside of said second resonator of said second laser for mixing the laser beam with said third wavelength between 250 and 275 nm and the laser beam with said fourth wavelength between 650 and 785 nm to be a sum frequency and generating a laser beam with said fifth wavelength between 190 and 200 nm.

2. A wavelength converter according to claim 1, wherein an optical pulse with said third wavelength which is the fourth harmonic of a laser beam output from said first laser and an optical pulse with said fourth wavelength acquired for said second laser are held sufficiently overlapped spatially and in time in a nonlinear optical crystal equivalent to said wavelength converting part for generating a laser beam with said fifth wavelength by mixing said optical pulses to be a sum frequency.

3. A wavelength converter according to claim 1, wherein a feedback circuit is used so that an optical pulse with said third wavelength which is the fourth harmonic of a laser beam output from said first laser and an optical pulse with said fourth wavelength acquired from said second laser are held sufficiently overlapped spatially and in time in a nonlinear optical crystal equivalent to said wavelength converting part for generating a laser beam with said fifth wavelength by mixing said optical pulses to be a sum frequency utilizing delay due to optical path difference between the optical pulse with said third wavelength and the optical pulse with said fourth wavelength or the delay of a trigger to a Q-switched laser.

4. A wavelength converter according to claim 1, wherein said first laser is a Q-switched laser.

5. A wavelength converter according to claim 4, wherein said Q-switched laser is a Q-switched laser to which injection seeding is applied.

6. A wavelength converter according to claim 1, wherein said first laser is a Q-switched laser; and said second laser is excited by a continuous wave.

7. A wavelength converter according to claim 1, wherein said second laser oscillates with a continuous wave.

8. A wavelength converter according to claim 1, wherein said first laser and said second laser are both a continuous wave laser.

9. A wavelength converter according to claim 8, wherein said first laser and said second laser are both a continuous wave laser oscillated with a single frequency.

10. A wavelength converter according to claim 1, wherein an injection locking or injection seeding is applied to said second laser using an injection (master) laser.

11. A wavelength converter according to claim 10, wherein the injection output of said injection laser is variable.

12. A wavelength converter according to claim 1, wherein said fifth wavelength is equivalent to 193.3 (the center wavelength of argon fluoride) ±0.2 nm.

13. A wavelength converter according to claim 1, wherein the wavelength of an output beam with said fifth wavelength is 20 pm (picometer) or less.

14. A wavelength converter according to claim 13, wherein the wavelength of an output beam with said fifth wavelength is 0.05 pm or more and 1 pm or less.

15. A wavelength converter according to claim 1, wherein wavelength selecting means is provided in said second laser.

16. A wavelength converter according to claim 1, wherein said first laser is provided with a solid state laser medium including a rare earth ion selected from the group of rare earth ions consisting of a neodymium ion and a ytterbium ion.

17. A wavelength converter according to claim 16, wherein said first laser is provided with either medium of Nd: YAG or Nd: YVO$_4$ respectively oscillating at 1064 nm.

18. A wavelength converter according to claim 16, wherein said first laser is provided with any medium of Nd: YLF, Nd: Glass and Yb: YAG.

19. A wavelength converter according to claim 16, wherein the solid state laser medium including a rare earth ion of said first laser is excited by at least one semiconductor laser.

20. A wavelength converter according to claim 1, wherein said second laser is pumped by a laser beam with said second wavelength between 500 and 550 nm acquired by converting the wavelength of a laser beam output from said first laser.

21. A wavelength converter according to claim 1, wherein said second laser is provided with a laser medium including a titanium ion or a chromium ion.

22. A wavelength converter according to claim 21, wherein said second laser is provided with a titanium sapphire crystal, Cr: LiSAF, Cr: LiCAF or an alexandrite crystal.

23. A wavelength converter according to claim 1, wherein said second laser is provided with a nonlinear optical crystal used for an optical parametric process.

24. A wavelength converter according to claim 1, wherein a laser beam with said second wavelength is the second harmonic of a laser beam oscillated by said first laser.

25. A wavelength converter according to claim 1, wherein a laser beam with said third wavelength is the fourth harmonic of a laser beam oscillated by said first laser.

26. A wavelength converter according to claim 1, wherein said wavelength converting section for receiving a laser beam with said second wavelength and outputting a laser beam with said third wavelength is provided with at least one crystal of β-barium borate (BBO) (β-BaB$_2$O$_4$).

27. A wavelength converter according to claim 1, wherein said wavelength converting part for receiving a laser beam with said third wavelength and a laser beam with said fourth wavelength and outputting a laser beam with said fifth wavelength is provided with at least one crystal of β-barium borate (BBO) (P-BaB$_2$O$_4$).

28. A wavelength converter according to claim 1, wherein said wavelength converting part for outputting a laser beam with said fifth wavelength is provided with at least one nonlinear optical crystal on which a laser beam is incident at Brewster angle or approximately at Brewster angle.

29. A wavelength converter according to claim 1, wherein said second laser contains at least one crystal of β-ebarium borate (BBO) (β-BaB$_2$O$_4$) orat least one CLBO (CsLiB$_6$O$_{10}$) crystal.

30. A wavelength converter according to claim 29, wherein phase matching angle is between 70° and 80° with an axis c of said crystal.

31. A wavelength converter according to claim 29, wherein phase matching angle is between 70° and 77° with an axis c of said crystal.

32. A wavelength converter according to claim 1, wherein said second laser contains both a titanium sapphire crystal and a crystal of β-barium borate.

* * * * *

UNITED STATES PATENT AND TRADEMARK OFFICE
CERTIFICATE OF CORRECTION

PATENT NO. : 6,249,371 B1
DATED : June 19, 2001
INVENTOR(S) : Hisashi Masuda et al.

It is certified that error appears in the above-identified patent and that said Letters Patent is hereby corrected as shown below:

Column 3,
Line 35, change "gerator" to -- generator --.

Column 5,
Line 2, change "Brewster" to -- Brewster's --; and
Line 32, change "efficient" to -- efficiently --.

Column 6,
Line 12, after "with", delete "the" and insert -- a --.

Column 7,
Line 33, change "maybe" to -- may be --;
Line 37, change "wavelength, however," to -- wavelength. However, --;
Line 43, "intensityof" to -- intensity of --;
Line 44, change "fourthhigher" to -- fourth higher --; and
Line 64, "$(\tau 0+\tau 1+\tau 2+3-\tau)$" to -- $(\tau 0+\tau 1+\tau 2+\tau 3-\tau)$ --.

Column 8,
Line 24, change "whichabeam" to -- which a beam --.

Column 9,
Line 22, after "C", delete ".";
Line 45, change "deff" to -- $d_{eff}$ --; and
Line 56, change $\xi$ to -- $\zeta$ -- .

Column 10,
Line 15, after "If", insert -- the --.

Column 12,
Line 8, change "difference" to -- differences --;
Line 29, change "suf ficient" to -- sufficient --; and
Line 35, change "f irst" to -- first --.

UNITED STATES PATENT AND TRADEMARK OFFICE
CERTIFICATE OF CORRECTION

PATENT NO. : 6,249,371 B1
DATED : June 19, 2001
INVENTOR(S) : Hisashi Masuda et al.

It is certified that error appears in the above-identified patent and that said Letters Patent is hereby corrected as shown below:

<u>Column 13,</u>
Line 63, change "wavelenghth" to -- wavelength --.

Signed and Sealed this

Fifth Day of March, 2002

Attest:

JAMES E. ROGAN
*Attesting Officer*  *Director of the United States Patent and Trademark Office*